Patented Sept. 28, 1954

2,690,391

UNITED STATES PATENT OFFICE 2,690,391

USE OF HYDROGEN IN PRECIPITATION OF COBALT CARBONATE

Rolf Falck-Muus, Brooklyn, N. Y., assignor to Chemical Construction Corporation, New York, N. Y., a corporation of Delaware No Drawing. Application September 23, 1952, Serial No. 311,168

1 Claim. (Cl. 75—119)

This invention relates to the hydrometallurgy of nickel and cobalt. More specifically, it is concerned with a selective removal of substantially all the cobalt, from solutions containing salts of both nickel and cobalt. Still more particularly, it involves a method whereby substantially all the cobalt content of such solutions is precipitated as a cobalt carbonate, leaving a solution from which metallic nickel is easily recovered by known methods.

Nickel and cobalt metals are very similar in many physical and chemical characteristics. The same is true of their salts and naturally-occurring minerals. Moreover, minerals of both generally occur together in natural deposits and usually cannot be separated by ordinary dressing practices. For these reasons, both metals are generally present, in varying amounts, in any solution resulting from any type of leaching of materials containing cobalt and nickel.

This results in many technical and economic problems. For example, in most ordinary practices, small amounts of cobalt present in nickel ore concentrates represent little of benefit to the nickel producer. Very little cobalt available in such materials is recovered and sold as such, primarily because by current methods the cost of separation equals or exceeds the additional value. Much, if not most, of the cobalt is lost in the slag from nickel smelting. The remainder is sold as "nickel" in nickel metal bullion or cathodes.

Similarly, small amounts of nickel present in cobalt concentrates and, therefore, in the "cobalt" solutions after leaching are of small value. It is generally either discarded, a considerable loss, or is recovered with the "cobalt." In the latter case, the nickel becomes an impurity in the cobalt metal and generally the producer is not paid for it. While certain nickel and cobalt mixed metals are marketable as such, it is usually at a price below the value of the pure metals in separate products.

In conventional metallurgy of nickel and cobalt, then, the presence of smaller but appreciable quantities of either in sources of the other, i. e., in ores, ore concentrates, scrap metals, plant by-products and the like, presents a serious and difficult problem. This problem has heretofore been variously attacked. However, a generally practicable treatment, whereby the bulk of each may be recovered in a separate, relatively-pure metal product, has not been offered.

Many processes have been proposed for separation and recovery of cobalt and nickel from mixed electrolytes. Several have been used quite extensively. Most involve the same two facts, that cobalt is more readily oxidized to the trivalent state than is nickel and that cobaltic hydroxide is relatively more insoluble at lower pH values than is nickelous hydroxide. Unfortunately, the necessary steps are complicated and repetitive, the hydroxides are difficult to filter efficiently and the resultant separations are far from perfect. Moreover, most of them also require large quantities of chemical reagents, many of which are non-regenerative. In addition to the effect on costs, this creates a disposal problem.

Several methods of separating nickel and cobalt from ammonium carbonate leach liquors also have been proposed. Most of these involve fractional distillation of the ammonium carbonate. Liquor, at different stages in the process, thereby becomes concentrated with either nickel or cobalt. This liquor may then be removed and treated separately. The residue must also be redissolved and retreated separately. However, as processing methods, or as to product metals, these are economically and practically little better than the electrolytic treatments.

Such conventional processes for the production of nickel or cobalt, then, are commercially unsatisfactory as too complicated, wasteful, or uneconomical, or as resulting in products containing undesirably large amounts of the other metal. Neither do they produce saleable metals. The resultant oxide or hydroxides must be processed further to obtain this result.

In the copending application for United States Letters Patent, Serial No. 310,953, filed of even date by F. A. Schaufelberger and assigned to the same assignee, it is shown that such solutions, containing up to about 100 gms./liter of dissolved metallic cobalt plus nickel in carbonate liquors and about 135 gms./liter of metal in sulfate liquors, can be treated to selectively precipitate the cobalt content as a cobalt carbonate. Removal of the precipitate leaves a solution from which high-grade nickel can be obtained in any desired manner.

As shown therein, precipitation of cobalt is induced by adjusting the solute content and then heating the solution. The solute content is adjusted in accordance with the dissolved nickel and/or cobalt content to an available ammonia:-dissolved metal mol ratio of about 2.0 or more and an ammonium carbonate:dissolved metal ratio of about 1:1 to about 1:4. The solution is then heated to temperatures of from about 140° C. to about 170° C. until cobalt precipitation ceases. The precipitate will contain substantially all the cobalt and some of the nickel. In general the metal content of the precipitate will vary from a cobalt:nickel ratio of about 1:1 up to as high as about 50:1.

For most purposes, this procedure is satisfactory. A modification is that of the copending joint application of the same F. A. Schaufelberger and J. O. Dasher, Serial No. 310,954, also filed of even date, in which much of the cobalt may be precipitated at low temperatures followed by a treatment at high temperature to increase the cobalt yield. This has the advantage of permitting separate recovery of much of the cobalt carbonate, i. e., the low temperature precipitate, in a substantially nickel-free condition.

However, in each of these, the best separation so far found, depends upon a final stripping of cobalt at elevated temperature and pressure. This much is common to both and to this extent they are both subject to the same limitations. For some cases, this high-temperature precipitation of the cobalt will not reduce the residual content thereof as low as may be desired.

In these or any similar separatory procedures, residual nickel solution, from which nickel is to be recovered, may have reduced cobalt content but it can never be quite zero. In the procedures of the above described copending applications, residual solutions containing as little as 0.5 gms. cobalt per liter can be readily obtained in many cases. In some it can even be lower. However, to obtain the latter may involve conjoint precipitation with cobalt of quite large amounts of nickel, a procedure not always desirable.

Nickel when recovered will contain the cobalt content of the solution as diluent. As noted above, no compensation is received for this cobalt, the intrinsic value of which is higher than the nickel. In some cases the nickel may be penalized for the content of cobalt. It is desirable to prevent this insofar as possible. Particularly is the situation encountered when the original materials have a high cobalt to nickel ratio. Removal of the cobalt down to 0.5 gm. per liter may represent a good cobalt recovery as compared with the original content but may still leave a fairly low nickel:cobalt ratio in the solution.

It is, therefore, desirable for the borderline cases to be able to reduce the residual dissolved cobalt content to levels lower than those readily obtainable in the processes of the above identified applications. It is, therefore, the principal object of the present invention to devise a process wherein this may be accomplished.

In general, the object of the invention is accomplished in a straightforward manner. Precipitation of cobalt carbonate is carried out in the presence of an atmosphere of hydrogen. This results not only in a more complete cobalt precipitation but precipitation of the cobalt in a better grade in many cases.

The process of the present invention may be utilized to carry out the high temperature precipitation of the above discussed processes, or it may be carried out as an after step. In general, the former procedure is preferable as involving less apparatus and less processing. The precise effect of the hydrogen in the operation of the present process is not definitely understood and it is not intended that the invention be limited to a particular theory of operation. It would appear, however, that at least a part of the cobalt retained in solution at the end of the high temperature precipitation, as previously carried out, is in the form of a cobaltic ammine as a result of a secondary oxidation of the cobalt by air. Under the conditions of the present process, any trivalent cobalt is reduced and the resultant cobaltous ions precipitated as additional carbonates.

Operating conditions are essentially simple. The solution, before precipitation, should contain enough ammonia as available ammonia and enough ammonium carbonate to insure the nickel being retained in solution. On the other hand, there should not be sufficient available ammonia to unduly inhibit cobalt carbonate precipitation. In general, as noted above, it will be desirable to use about 2 mols or more of available ammonia per mol of dissolved nickel plus cobalt and from about 1 to about 4 mols of ammonium carbonate per mol of dissolved metal. Precipitation is carried out by heating to from about 140°–170° C. The principal effect of the higher end of the temperature range is to shorten the operating time. The cobalt carbonates obtained at about 145° C. to about 160° C. are in somewhat more desirable physical condition than those obtained at slightly higher temperatures. For this reason the 145°–160° C. temperature range is desirable.

Precipitation is carried out in the normal process under some 50 to 300 pounds per square inch pressure in order to obtain the temperature desired. An additional pressure of some 50 to a few hundred lbs. per square inch of hydrogen is added. Precipitation is carried out in a suitable vessel, preferably with stirring, and will usually be complete in some 5 to 30 minutes.

As in the processes of the above identified applications the process here is not limited to the treatment of carbonate liquors. Almost any anion which does not form a cobalt or nickel salt more insoluble than the carbonate may be present. Anions, such as cyanide, which form practically undissociated complexes, should be avoided. Both carbonates and sulfates are commonly encountered in industrial practice. The sulfate is particularly notable in that the cobalt carbonate precipitate can be obtained from a solution containing nickel and cobalt sulfates merely by adding sufficient additional carbonate to insure formation of that salt.

Where in the present specification and claims the terms "free" and "available" ammonia have been used, it is intended to designate any ammonia dissolved in the solution per se, or as ammonium hydroxide, and any ammonia combined with the metals as a metal-ammonia complex ion.

Where in the present discussion adjustment of ammonium carbonate content has been noted, such adjustment, if by addition, may be made in several ways. It may be added as a solid or as a solution. Alternatively, ammonia may be added separately or together as gases or dissolved in water. Mention in the claims of ammonium carbonate adjustment or addition is intended to include any of these methods.

It is believed that the effectiveness in operation of the process of the present invention can be demonstrated in the following examples. These are offered by way of illustration and are not necessarily limitative. Except where otherwise noted in each of the examples, the solution is a plant by-product solution obtained in the leaching of ores containing cobalt, nickel and copper and which has been previously processed for other purposes. The solution contains for each liter about 1.5% nickel as nickel carbonate, 1.5 grams of cobalt carbonate, about 5% CO₂ and 7% NH₃ as ammonium hydroxide and ammonium carbonate.

EXAMPLE 1

For each liter of a sample of the above solution was added 50 grams of ammonium carbonate and the resultant solution charged to an autoclave in which it was held with stirring at about 170° C. for about one hour under an average total pressure of about 320 lbs./sq. in. The autoclave was cooled, discharged and the slurry filtered. A small amount of grayish-white residue remained on the filter. The solution contents are shown below in Table I.

EXAMPLE 2

Example 1 was repeated except that the total pressure was obtained by pressurizing the vessel to 200 lbs./sq. in. with hydrogen before heating. The pressure increased to about 620 lbs./sq. in. and at the end after cooling had decreased to about 170 lbs./sq. in. A small pinkish residue was collected on the filter. The solution contents are shown below in Table I.

EXAMPLE 3

In order to show the effect of the hydrogen in Example 2, the procedure was repeated on another sample, differing only in that it contained about 2 grams/liter of cobalt carbonate. The vessel was pressurized to about 200 lbs./sq. in. with nitrogen before heating. The pressure increased to about 600 lbs./sq. in. and fell off at the end of the treatment to about 200 lbs./sq. in. A small dirty white residue was collected on the filter.

EXAMPLE 4

Example 3 was repeated on another sample of the same solution. The vessel was pressurized to about 200 lbs./sq. in. with hydrogen rather than nitrogen before heating. During treatment the pressure went up to 620 lbs./sq. in. and at the end after cooling had decreased to 180 lbs./sq. in. A pinkish residue was collected on the filter. The solution contents are shown below in Table I.

*Table I*

TEST CONDITIONS AND RESULTS

| Ex. No. | Initial Pressure (p.s.i.g.) | Total Pressure (p.s.i.g.) | Final Pressure (p.s.i.g.) | Initial Co Content (gms./l.) | Final Co Content (gms./l.) |
|---|---|---|---|---|---|
| 1 | 0 | 320 | 0 | 0.43 | 0.35 |
| 2 | 200(H₂) | 620 | 170 | 0.43 | 0.11 |
| 3 | 200(N₂) | 600 | 200 | 0.53 | 0.53 |
| 4 | 200(H₂) | 630 | 180 | 0.53 | 0.21 |

From the foregoing examples it is apparent that the hydrogen present during the high temperature precipitation has a beneficial effect in reducing the residual dissolved cobalt content.

I claim:

In recovering high purity nickel from ammoniacal-ammonium salt solutions containing dissolved nickel and cobalt values in which the cobalt content is precipitated as a carbonate by adjusting the ammonia and ammonium salt content of the solution to retain the nickel in solution and heating the adjusted solution to above 140° C., the combination therewith of the improvement characterized by carrying out the heating of the adjusted solution in an atmosphere comprising hydrogen gas.

No references cited.